United States Patent
Chen

(10) Patent No.: US 12,527,487 B1
(45) Date of Patent: Jan. 20, 2026

(54) HEART RATE DETECTION EARPHONE AND EARPHONE DEVICE

(71) Applicant: Shenzhen Cantianshu Information Technology Co., Ltd., Shenzhen (CN)

(72) Inventor: Qingliang Chen, Shantou (CN)

(73) Assignee: Shenzhen Cantianshu Information Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/281,881

(22) Filed: Jul. 28, 2025

(51) Int. Cl.
*A61B 5/024* (2006.01)
*A61B 5/00* (2006.01)
*H04R 1/10* (2006.01)

(52) U.S. Cl.
CPC ........ *A61B 5/02438* (2013.01); *A61B 5/6803* (2013.01); *H04R 1/1016* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 2022/0192335 A1* | 6/2022 | Maguire | A45C 13/1069 |
| 2022/0279262 A1* | 9/2022 | Zhang | H04R 1/1066 |

* cited by examiner

*Primary Examiner* — Carl H Layno
*Assistant Examiner* — Bryan McAllister Lee
(74) *Attorney, Agent, or Firm* — JEEN IP LAW, LLC

(57) ABSTRACT

A heart rate detection earphone and an earphone device are provided. The heart rate detection earphone includes an earphone housing and an earphone functional component. The earphone housing includes an ear hook part, a connection part, and an earphone part. One end of the connection part is connected to the ear hook part, and the other end of the connection part is connected to the earphone part. The earphone functional component includes an earphone circuit board, an earphone battery module, an earphone speaker module, and a heart rate detection module. The earphone battery module is electrically connected to the earphone circuit board. The earphone speaker module is fixedly provided on the earphone part. The heart rate detection module is provided on the earphone part and electrically connected to the earphone circuit board. The heart rate detection earphone has more diverse functions and meets special needs of users.

6 Claims, 10 Drawing Sheets

HEART RATE DETECTION EARPHONE AND EARPHONE DEVICE

TECHNICAL FIELD

The present disclosure relates to the field of earphone technologies, and in particular, to a heart rate detection earphone and an earphone device.

BACKGROUND

Bluetooth earphones apply Bluetooth technology to hands-free earphones, allowing users to easily communicate in various ways without worrying about wires. Since its inception, Bluetooth earphones have become a good tool for improving efficiency. Currently, Bluetooth earphones generally only support a single audio transmission function and are not suitable for meeting users' special needs.

SUMMARY

In order to make the functions of the earphones more diverse and meet the special needs of users, this application provides a heart rate detection earphone and an earphone device.

The heart rate detection earphone and earphone device provided in this application adopt the following technical solution.

A heart rate detection earphone, including an earphone housing and an earphone functional component; the earphone housing includes an ear hook part, a connection part, and an earphone part; one end of the connection part is connected to the ear hook part, and the other end thereof is connected to the earphone part; the earphone functional component includes an earphone circuit board, an earphone battery module, an earphone speaker module, and a heart rate detection module; the earphone circuit board and the earphone battery module are both fixedly provided on the ear hook part; the earphone battery module is electrically connected to the earphone circuit board; the earphone speaker module is fixedly provided on the earphone part and electrically connected to the earphone circuit board; the heart rate detection module is provided on the earphone part and electrically connected to the earphone circuit board.

By adopting the above technical solution, when the user wears the heart rate detection earphone, the ear hook part is in contact with an outside of a user's ear, and the earphone part is in contact with the user's ear canal and facing the user's external auditory canal. When the heart rate detection earphone is used, the earphone battery module supplies power to the heart rate detection earphone, and the earphone circuit board transmits the audio signal to the earphone speaker module. The earphone speaker module vibrates and emits sound, which is transmitted to the user's external auditory canal. At the same time, when the ear hook part is in contact with the outside of the user's ear, the heart rate detection module is in contact with the outside of the user's ear, so that the heart rate detection module can detect the user's heart rate in real time, allowing the user to obtain their health state more accurately and timely, thereby enabling the earphone to have more diverse functions that are available to meet the special needs of users, which improves the problem that current Bluetooth earphones generally only support a single audio transmission function and are not suitable for meeting users' special needs.

In some embodiments of the present disclosure, the earphone circuit board is electrically connected to two charging columns, the ear hook part is provided with two charging holes that are penetrated through, and the two charging columns are respectively penetrated through the two charging holes.

In some embodiments of the present disclosure, one side of the ear hook part close to the earphone part is provided with a detection slot that is penetrated through, and the heart rate detection module is fixedly provided in the detection slot.

A heart rate detection earphone device, including two heart rate detection earphones and an earphone compartment configured to store the two heart rate detection earphones, where the two heart rate detection earphones are the above heart rate detection earphone, where the earphone compartment includes a compartment body, the compartment body includes a compartment main body and a compartment cover, the compartment cover is connected to the compartment main body, the compartment cover is opened or closed, the compartment main body is provided with two earphone slots, both of the two earphone slots include a first slot body part and a second slot body part, the first slot body part and the second slot body part are communicated, the first slot body part is configured to place the ear hook part, the second slot body is configured to place the earphone part, the compartment cover is provided with two compartment cover slots; when the compartment cover is closed, the two compartment cover slots are respectively communicated to the two earphone slots.

In some embodiments of the present disclosure, the earphone compartment further includes a compartment functional component, and the compartment functional component includes a compartment circuit board, a compartment battery module, and a heart rate display screen; the compartment circuit board and the compartment battery module are provided in the compartment main body, and the compartment battery module is electrically connected to the compartment circuit board; the heart rate display screen is provided on one side of the compartment main body and electrically connected to the compartment circuit board; the heart rate display screen displays a heart rate value of a user detected by the heart rate detection module.

In some embodiments of the present disclosure, the compartment circuit board is electrically connected with a plurality of charging pins, and when the heart rate detection earphone is placed in the earphone slots, each of the charging pins is respectively in contact with and electrically connected to each of the charging columns.

In some embodiments of the present disclosure, the compartment circuit board is electrically connected with a USB charging module, the compartment main body is provided with a charging slot that is penetrated through, and the USB charging module is penetrated through the charging slot.

In some embodiments of the present disclosure, the compartment circuit board is electrically connected with a control button, the compartment main body is provided with a button hole that is penetrated through, and the control button is penetrated and fitted with the button hole.

In some embodiments of the present disclosure, one side of the compartment cover is rotatably connected to one side of the compartment main body, the other side of the compartment cover is fixedly provided with a first magnetic attraction piece, and the other side of the compartment main body is fixedly provided with a second magnetic attraction piece; when the compartment cover is closed, the first magnetic attraction piece and the second magnetic attraction piece are magnetically fixed.

In some embodiments of the present disclosure, a compartment spring is provided between the compartment main body and the compartment cover, the compartment main body is provided with a spring groove, the compartment cover is provided with two spring holes, the compartment spring passes through and is matched with the spring groove; two ends of the compartment spring are respectively passes through the two spring holes.

In summary, this application includes at least one beneficial technical effect as follows.

When the user wears the heart rate detection earphone, the ear hook part is in contact with an outside of a user's ear, and the earphone part is in contact with the user's ear canal and facing the user's external auditory canal. When the heart rate detection earphone is used, the earphone battery module supplies power to the heart rate detection earphone, and the earphone circuit board transmits the audio signal to the earphone speaker module. The earphone speaker module vibrates and emits sound, which is transmitted to the user's external auditory canal. At the same time, when the ear hook part is in contact with the outside of the user's ear, the heart rate detection module is in contact with the outside of the user's ear, so that the heart rate detection module can detect the user's heart rate in real time, allowing the user to obtain their health state more accurately and timely, thereby enabling the earphone to have more diverse functions that are available to meet the special needs of users, which improves the problem that current Bluetooth earphones generally only support a single audio transmission function and are not suitable for meeting users' special needs.

Figure 1:
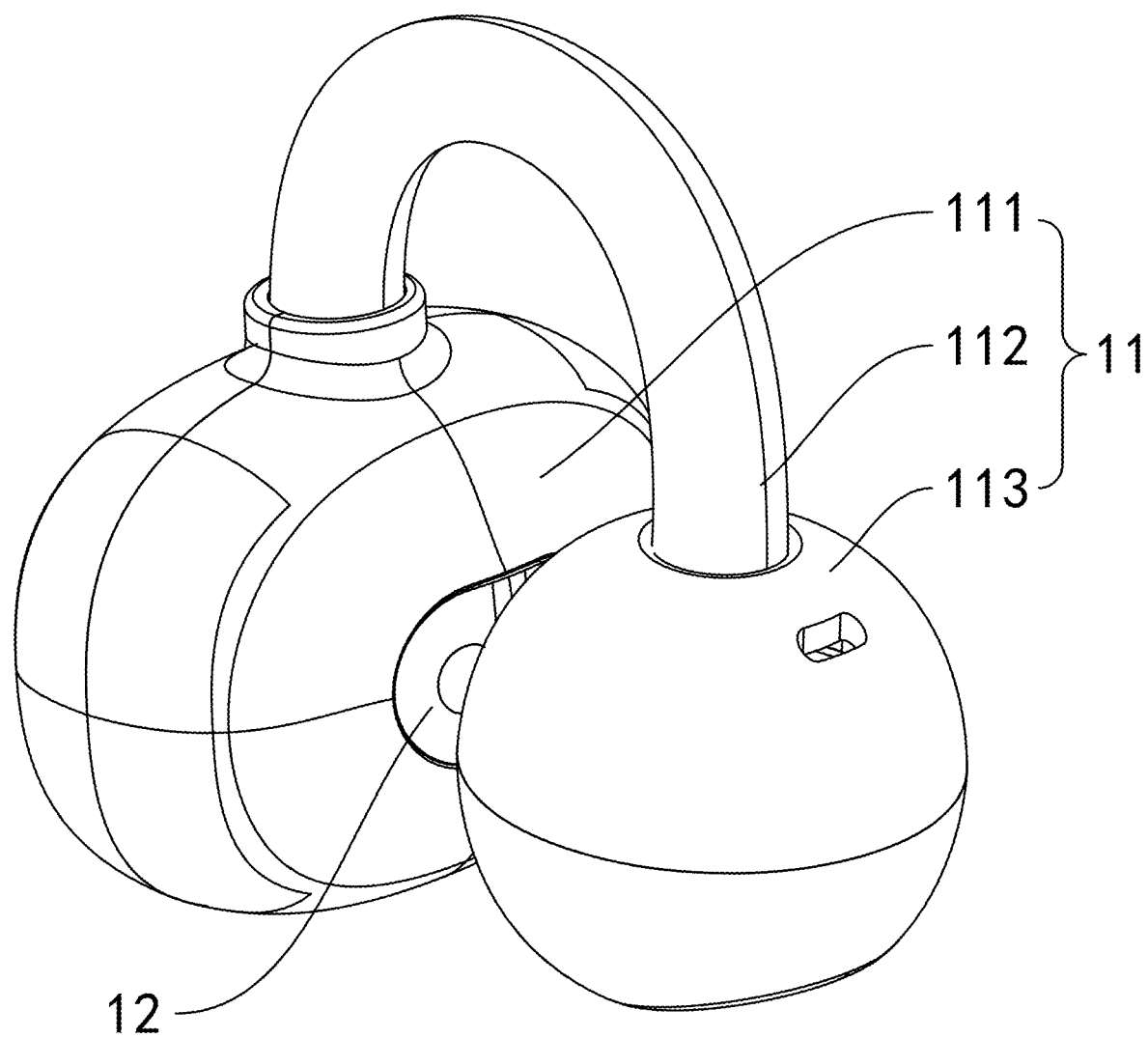
FIG. 1 is a schematic diagram of an overall structure of a heart rate detection earphone.
Figure 2:
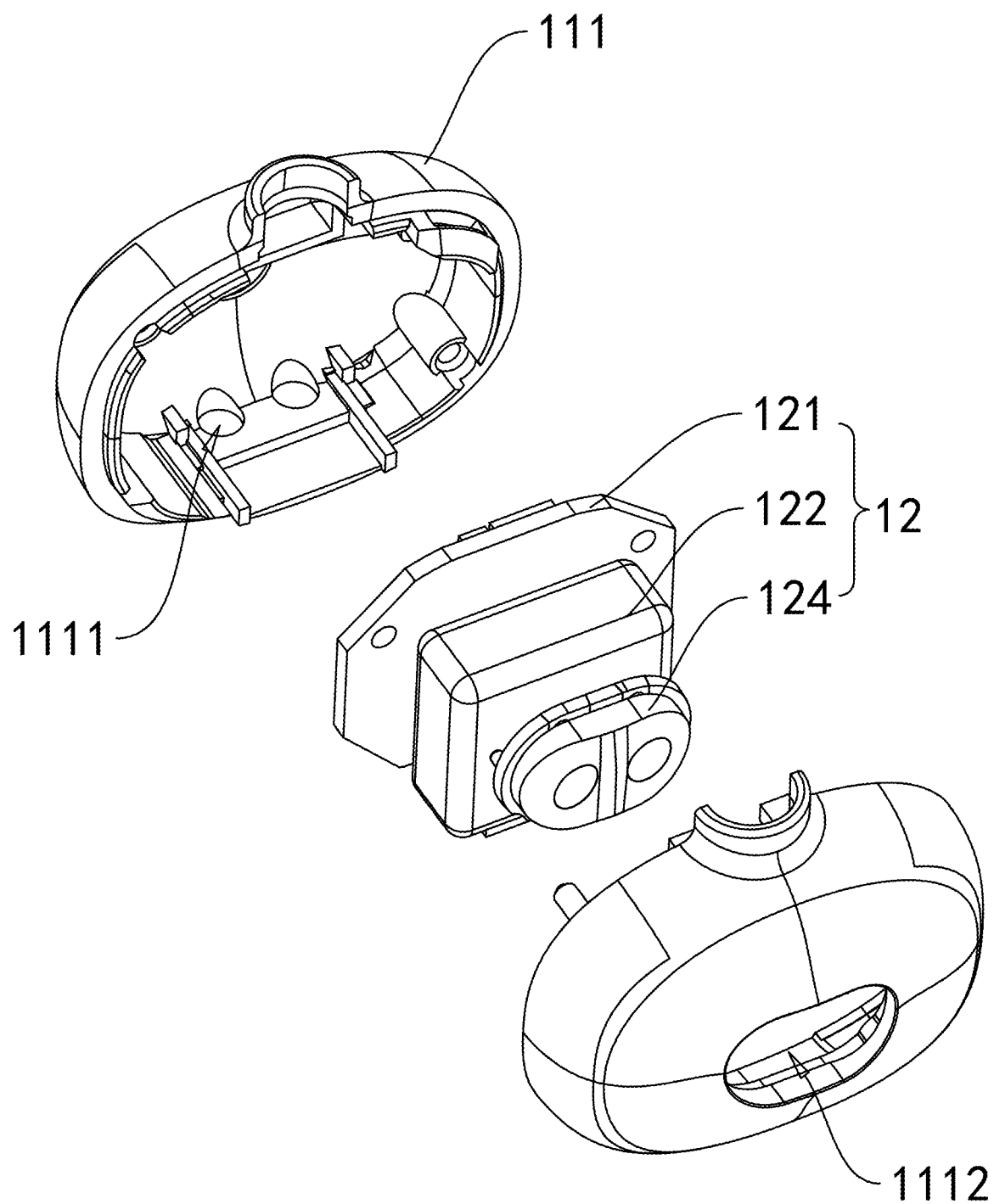
FIG. 2 is a first exploded view of an ear hook part of the heart rate detection earphone.
Figure 3:
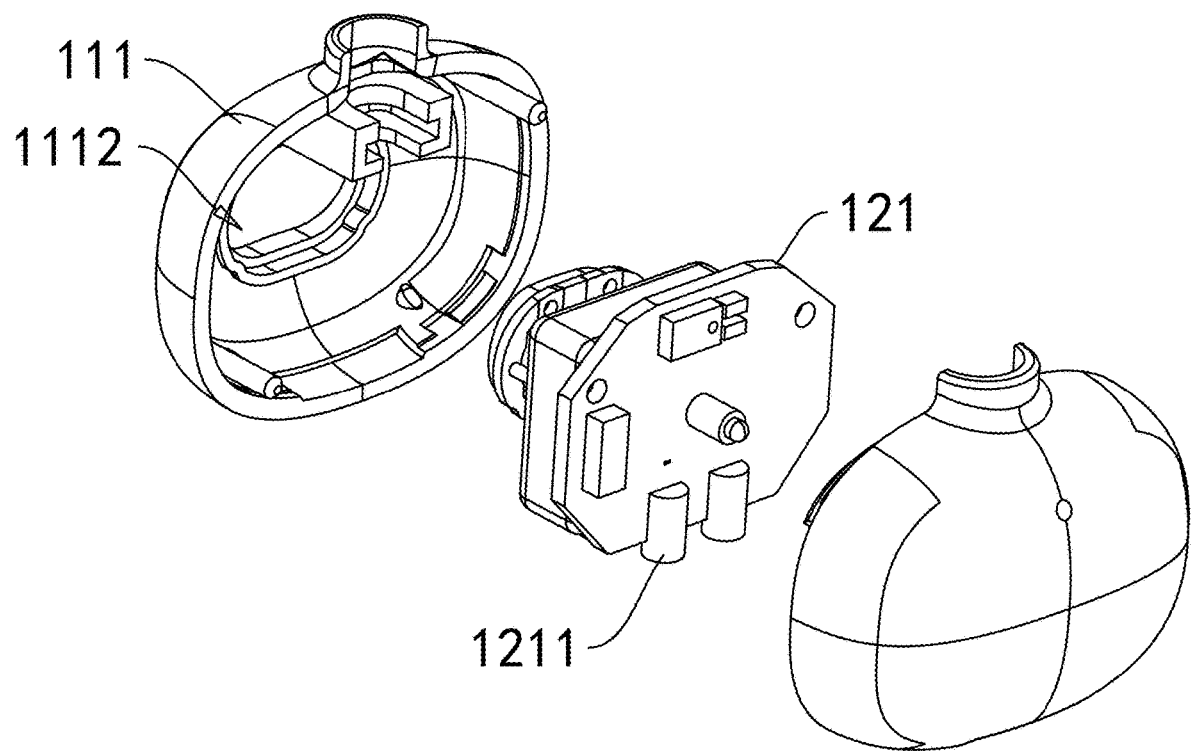
FIG. 3 is a second exploded view of the ear hook part of the heart rate detection earphone.
Figure 4:
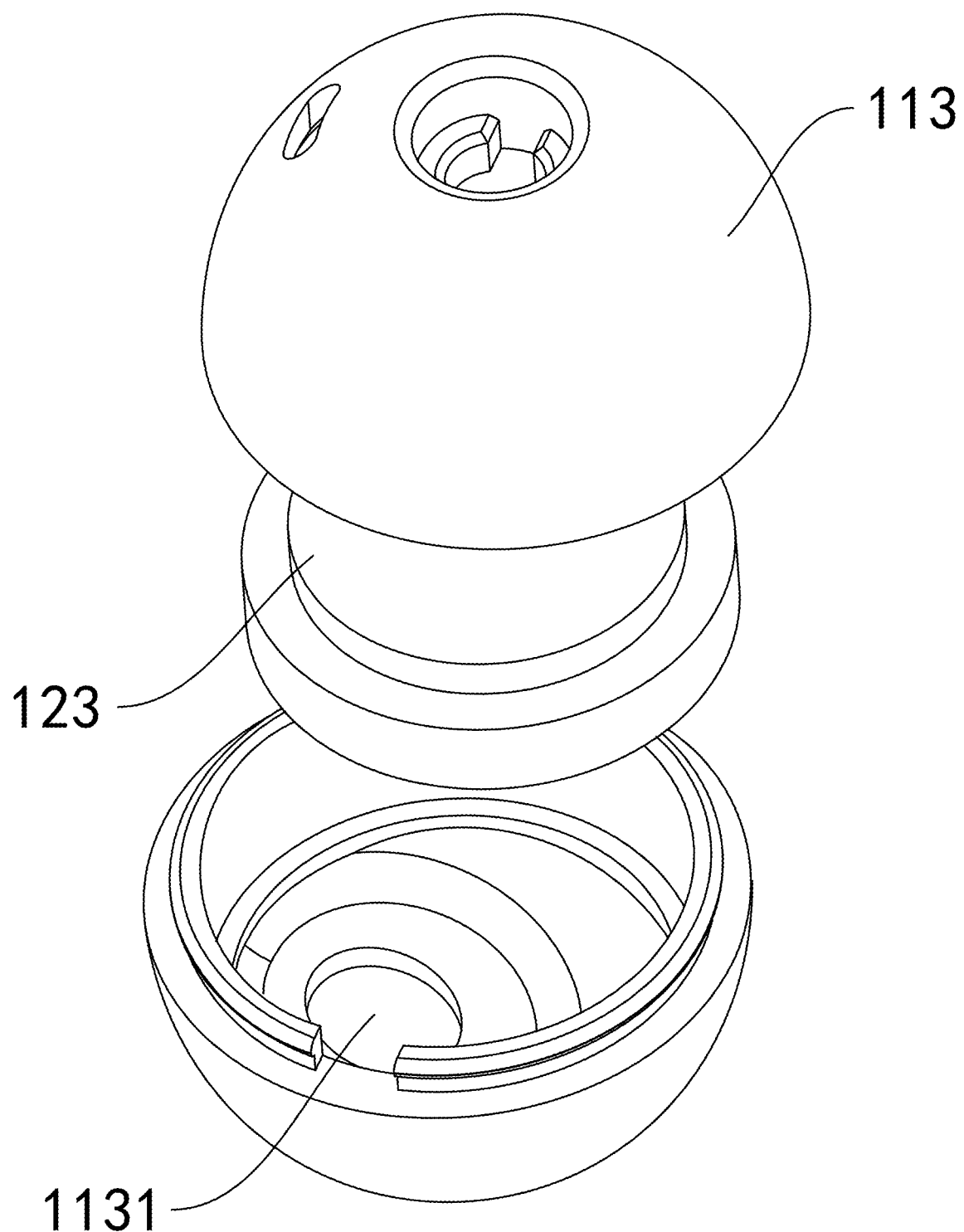
FIG. 4 is an exploded view of an earphone part of the heart rate detection earphone.

Numeral reference: 1—heart rate detection earphone; 11—earphone housing; 111—ear hook part; 1111—charging hole; 1112—detection slot; 112—connection part; 113—earphone part; 1131—speaker hole; 12—earphone functional component; 121—earphone circuit board; 1211—charging column; 122—earphone battery module; 123—earphone speaker module; 124—heart rate detection module; 2—earphone compartment; 21—compartment body; 211—compartment main body; 2111—first main body; 21111—charging slot; 21112—button hole; 2112—second main body; 21121—spring groove; 2113—earphone slot; 21131—first slot body part; 21132—second slot body part; 212—compartment cover; 2121—first cover part; 21211—spring hole; 2122—second cover part; 2123—compartment cover slot; 213—compartment spring; 22—compartment functional component; 221—compartment circuit board; 2211—charging pin; 2212—USB charging module; 2213—control button; 222—compartment battery module; 223—heart rate display screen.

DESCRIPTION OF EMBODIMENTS

Further detailed explanation of the present application will be provided in combination with FIGS. 1-10.

This application discloses a heart rate detection earphone and an earphone device. Referring to FIGS. 1 to 4, the heart rate detection earphone includes an earphone housing 11 and an earphone functional component 12. The earphone housing 11 includes an ear hook part 111, a connection part 112, and an earphone part 113. One end of the connection part 112 is connected to the ear hook part 111, and the other end thereof is connected to the earphone part 113. The earphone part 113 is spherical, and the connection part 112 is U-shaped.

Referring to FIGS. 1 to 4, the earphone functional component 12 includes an earphone circuit board 121, an earphone battery module 122, an earphone speaker module 123, and a heart rate detection module 124. The earphone circuit board 121 and the earphone battery module 122 are both fixedly provided inside the ear hook part 111. The earphone circuit board 121 is electrically connected to two charging columns 1211, and the ear hook part 111 is provided with two charging holes 1111 that are penetrated through. The two charging columns 1211 are respectively penetrated through the two charging holes 1111. The earphone battery module 122 is electrically connected to the earphone circuit board 121, and the earphone speaker module 123 is fixedly provided in the earphone part 113 and electrically connected to the earphone circuit board 121. The earphone part 113 is provided with a speaker hole 1131 that is penetrated through, and the earphone speaker module 123 is penetrated through the speaker hole 1131. A detection slot 1112 that runs through the ear hook part 111 is provided at one side of the ear hook part 111 close to the earphone part 113. The heart rate detection module 124 is fixedly provided in the detection slot 1112 and is electrically connected to the headphone circuit board 121.

The implementation principle of the heart rate detection earphone in this application is as follows: when a user wears the heart rate detection earphone 1, the ear hook part 111 is in contact with an outside of the user's ear, the earphone part 113 is in contact with the user's ear canal and is directly facing the user's external ear canal. When the heart rate detection earphone 1 is in use, the earphone battery module 122 supplies power to the heart rate detection earphone 1, and the earphone circuit board 121 transmits audio signals to the earphone speaker module 123. The earphone speaker module vibrates and emits sound, which is transmitted to the user's external ear canal. At the same time, when the ear hook part 111 is in contact with the outside of the user's ear, the heart rate detection module 124 is in contact with the outside of the user's ear, allowing the user to obtain their health state more accurately and timely, thereby enabling the earphone to have more diverse functions that are available to meet the special needs of users, which improves the problem that current Bluetooth earphones generally only support a single audio transmission function and are not suitable for meeting users' special needs.

Figure 5:
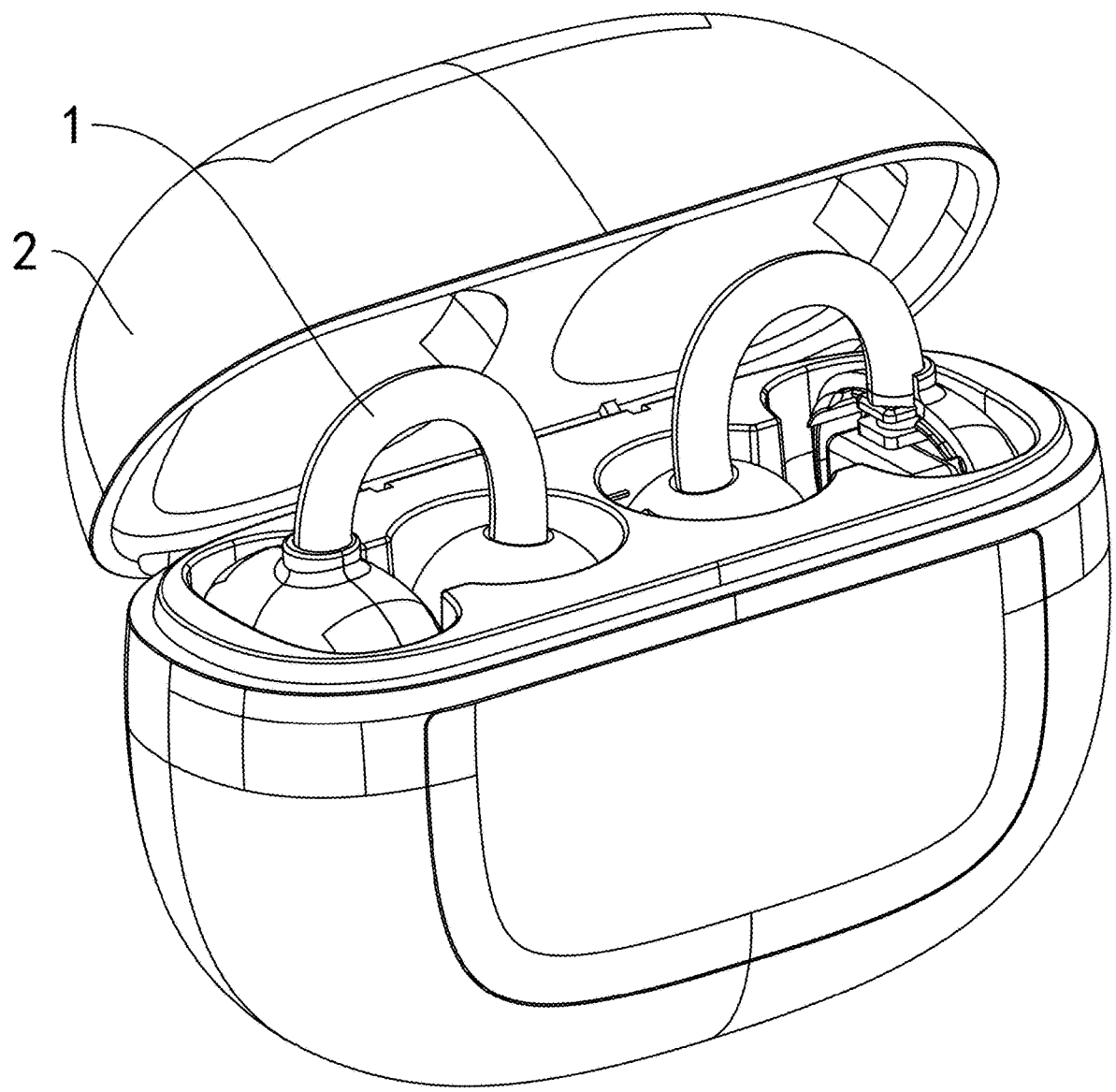
FIG. 5 is a schematic diagram of an overall structure of a heart rate detection earphone device.
Figure 6:
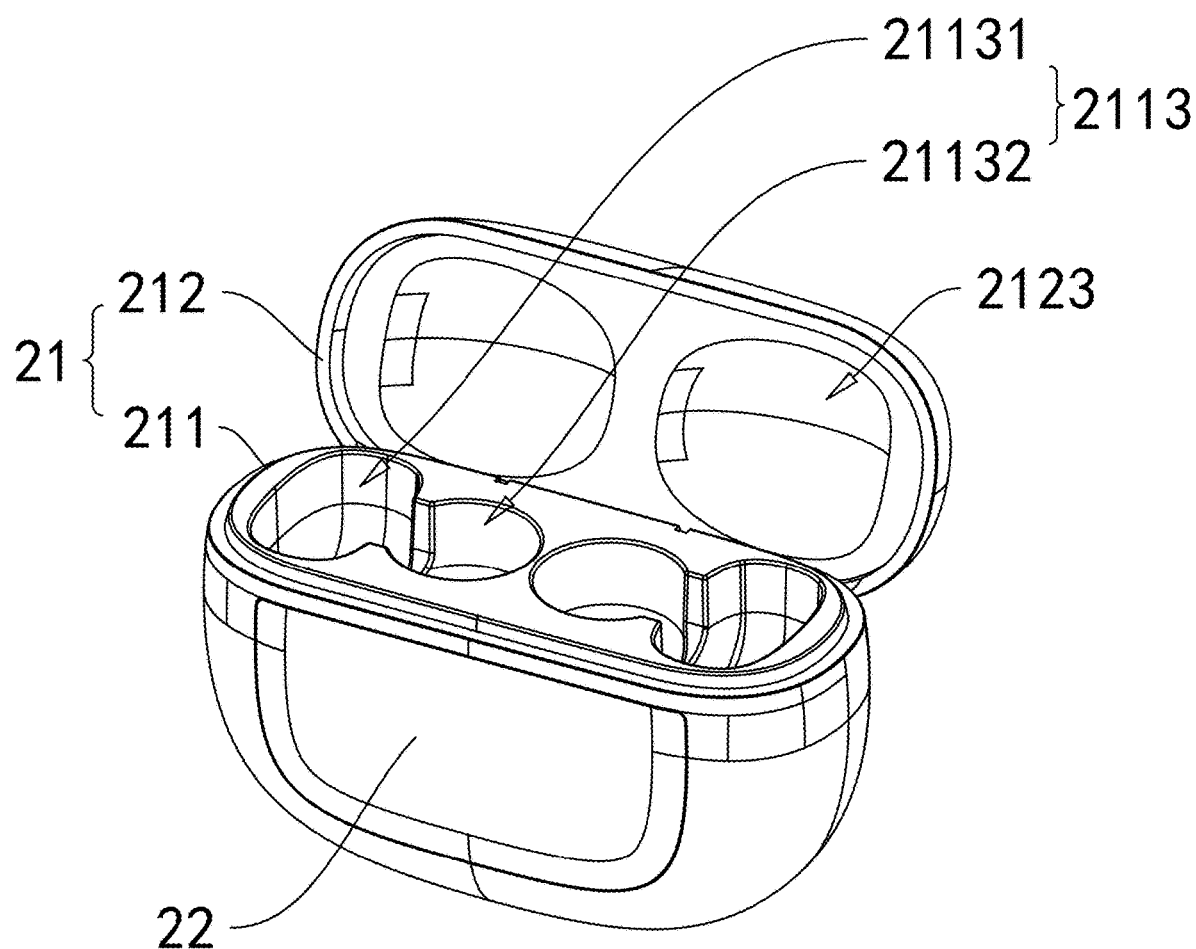
FIG. 6 is a schematic structural diagram of an earphone compartment of the heart rate detection earphone device.

Referring to FIGS. 5 and 6, a heart rate detection earphone device includes two heart rate detection earphones 1 and an earphone compartment 2 configured to store the two heart rate detection earphones 1. The earphone compartment 2 includes a compartment body 21, and the compartment body 21 includes a compartment main body 211 and a compartment cover 212. One side of the compartment cover 212 is rotatably connected to one side of the compartment main body 211, and the other side of the compartment cover 212 is fixedly provided with a first magnetic suction piece (not shown in the figure). The other side of the compartment main body 211 is fixedly provided with a second magnetic suction piece (not shown in the figure), and the compartment cover 212 can be opened or closed. When the compartment cover 212 is closed, the first magnetic suction piece and the second magnetic suction piece are magnetically fixed. In the embodiment of the present application, the first magnetic suction piece and the second magnetic suction piece are magnetically fixed. The magnetic attraction component and the second magnetic attraction component are both magnets.

Figure 7:
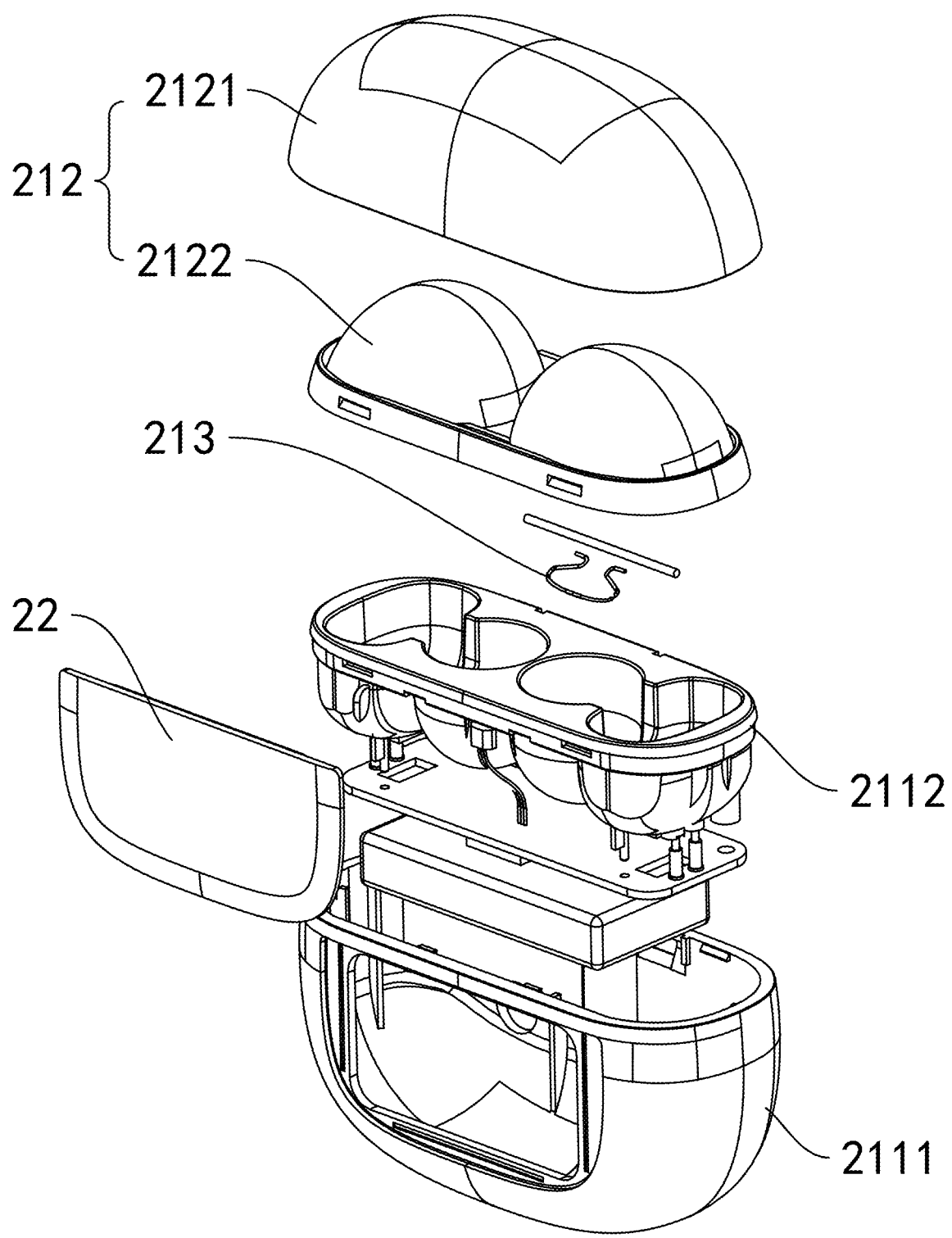
FIG. 7 is an exploded structural view of the earphone compartment of the heart rate detection earphone device.
Figure 8:
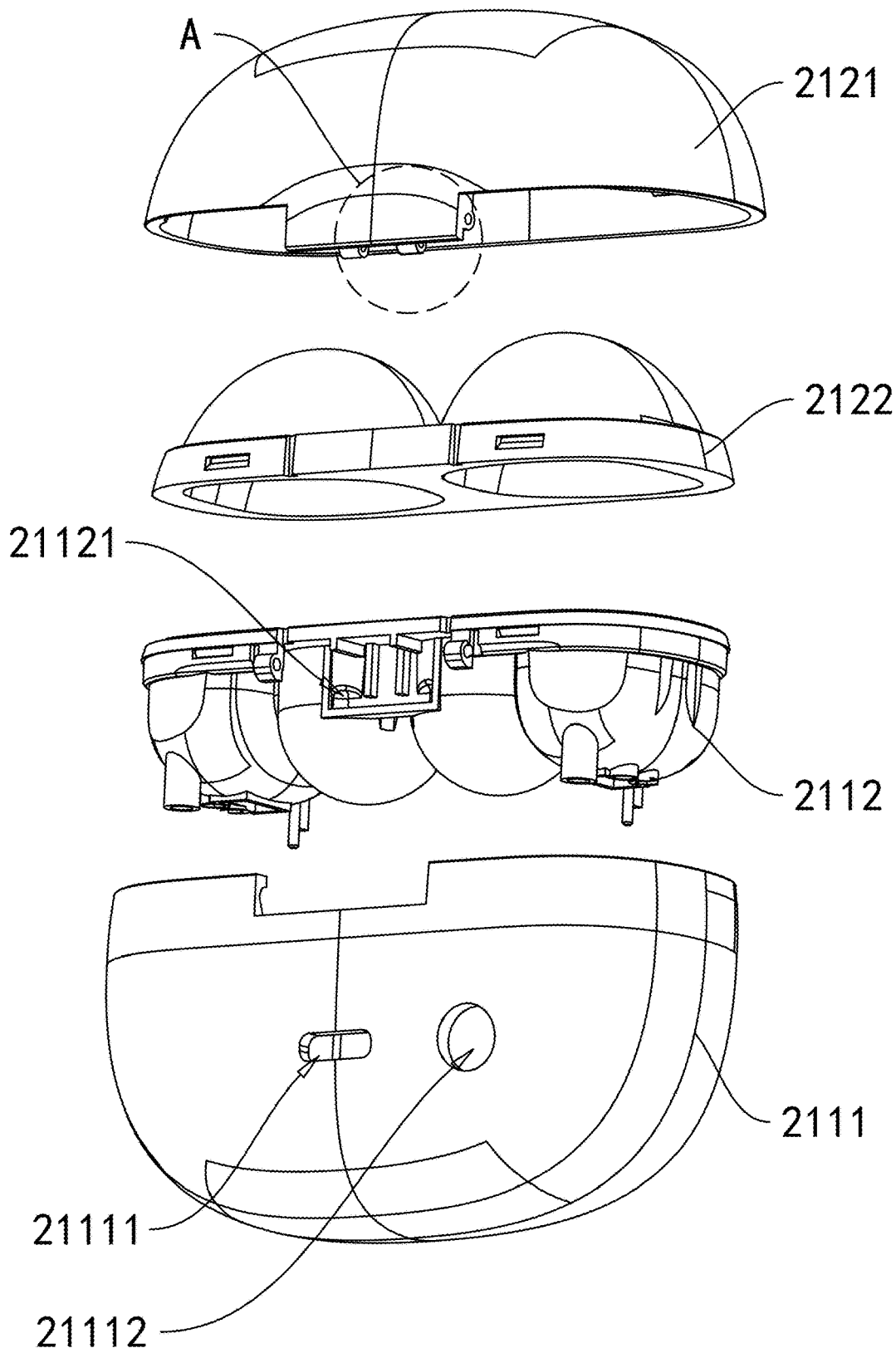
FIG. 8 is an explosive schematic diagram of a compartment body of the heart rate detection earphone device.
Figure 9:
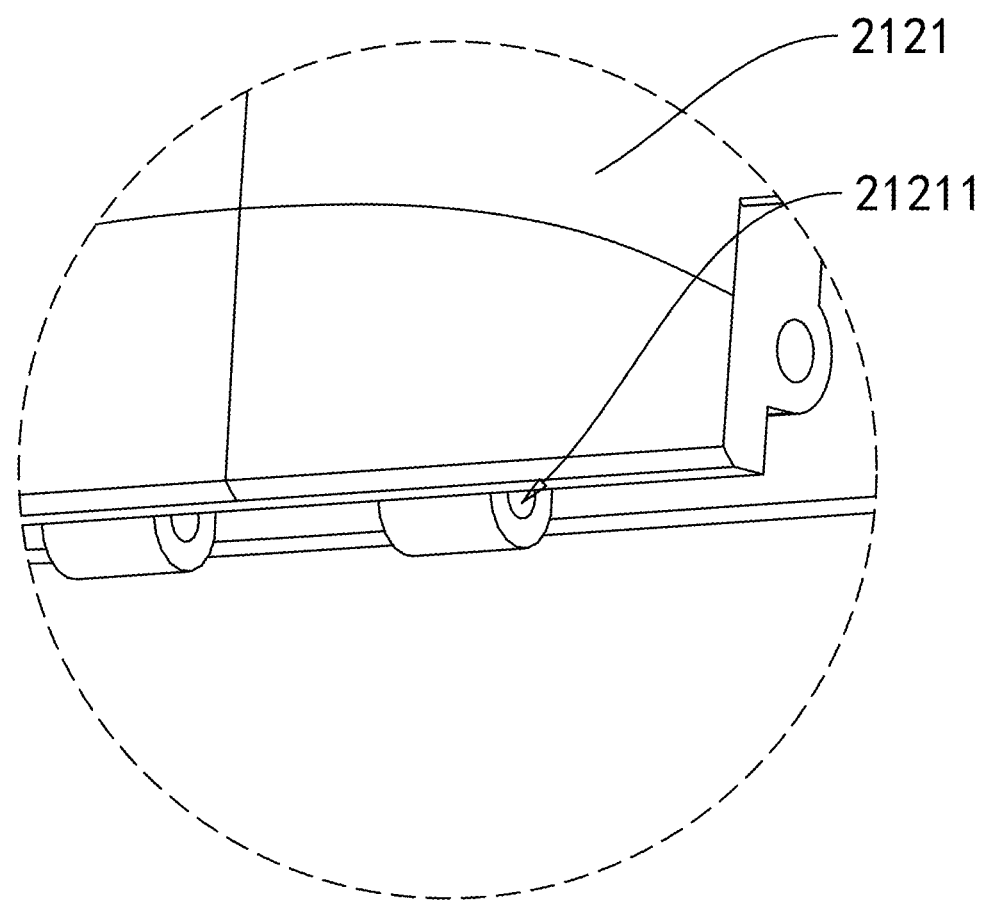
FIG. 9 is an enlarged view of part A of FIG. 8.

Referring to FIGS. 6 to 8, the compartment main body 211 includes a first main body part 2111 and a second main body part 2112. The second main body part 2112 is passed through the first main body part 2111 and fixed in a clamped manner with the first main body part 2111. The compartment main body 211 is provided with two earphone slots 2113, both of the two earphone slots 2113 are located in the second main body part 2112. The two earphone slots 2113 each include a first slot body part 21131 and a second slot body part 21132. The first slot body part 21131 is communicated with the second slot body part 21132. The first slot body part 21131 is configured to place the ear hook part 111, and the second slot body part 21132 is configured to place the headphone part 113. The compartment cover 212 includes a first cover part 2121 and a second cover part 2122, the second cover part 2122 is passed through the first cover part 2121 and fixed with the first cover part 2121 in a clamping manner, and the compartment cover 212 is provided with two compartment cover slots 2123, both of the two compartment cover slots 2123 are located in the second cover part 2122. When the compartment cover 212 is closed. The two compartment cover slots 2123 are respectively connected to the two earphone slots 2113.

Referring to FIGS. 6 to 9, a compartment spring 213 is provided between the compartment main body 211 and the compartment cover 212. The second main body 2112 is provided with a spring groove 21121, and the first cover part 2121 is provided with two spring holes 21211 that are penetrated through. The compartment spring 213 passes through and is in contact with the spring groove 21121. Two ends of the compartment spring 213 are respectively passed through the two spring holes 21211, so that when the compartment cover 212 is closed to a certain extent, the compartment spring 213 pushes the compartment cover 212 to rotate in a direction close to the compartment main body 211 until the compartment cover 212 is closed. When the compartment cover 212 is opened to a certain extent, the compartment spring 213 pushes the compartment cover 212 to be rotated away from the compartment main body 211 until the compartment cover 212 is open.

Figure 10:
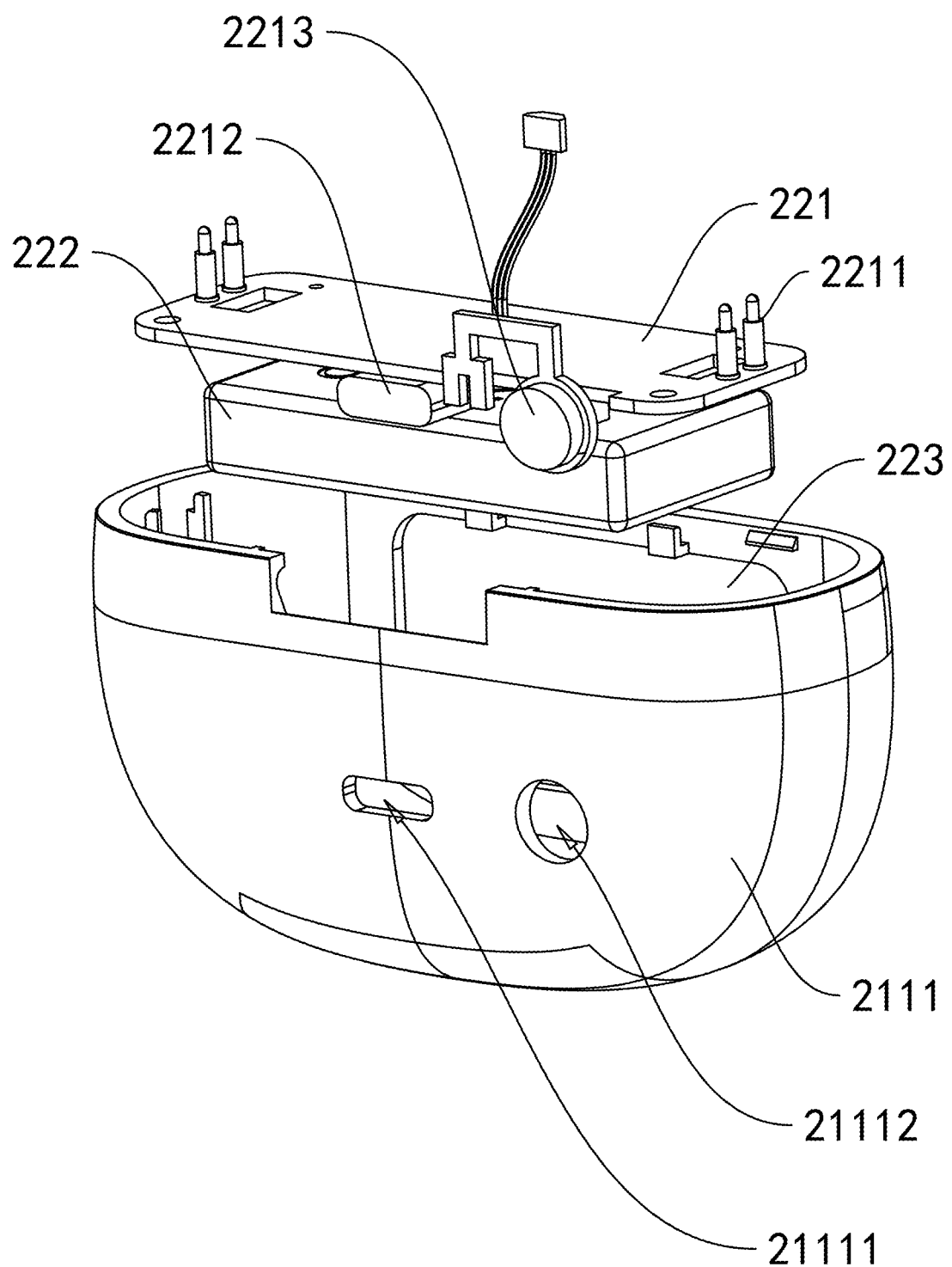
FIG. 10 is a schematic structural diagram of a compartment functional component of the heart rate detection earphone device.

Referring to FIG. 10, the earphone compartment 2 further includes a compartment functional component 22, and the compartment functional component 22 includes a compartment circuit board 221, a compartment battery module 222, and a heart rate display screen 223. The compartment circuit board 221 and the compartment battery module 222 are provided inside the compartment main body 211, that is, the compartment circuit board 221 and the compartment battery module 222 are located between the first main body part 2111 and the second main body part 2112. The compartment battery module 222 is electrically connected to the compartment circuit board 221, and the heart rate display screen 223 is provided on one side of the first main body part 2111 and electrically connected to the compartment circuit board 221. The heart rate display screen 223 can display the user's heart rate value detected by the heart rate detection module 124.

Referring to FIG. 10, the earphone compartment 2 circuit board is electrically connected with a plurality of charging pins 2211. When the heart rate detection earphone 1 is placed in the earphone slots 2113, each of the charging pins 2211 is respectively in contact with and electrically connected to each of the charging column 1211, so that when the heart rate detection earphone 1 is placed in the earphone slots 2113, the earphone compartment 2 charges the heart rate detection earphone 1. The compartment circuit board 221 is fixed and electrically connected with a USB charging module 2212. The first main body part 2111 is provided with a charging slot 21111 that is penetrated through. The USB charging module 2212 can charge the compartment battery module 222. The compartment circuit board 221 is electrically connected with a control button 2213. 1. The first main body 211 is provided with a button hole 21112 that is penetrated through, and the control button 2213 is penetrated and is fitted with the button hole 21112.

The above are preferred embodiments of the present application and do not limit the protection scope of the present application. Therefore, any equivalent changes made according to the structure, shape, and principle of the present application should be included in the protection scope of the present application.

What is claimed is:

1. A heart rate detection earphone device, comprising two heart rate detection earphones and an earphone compartment configured to store the two heart rate detection earphones, wherein each of the two heart rate detection earphones comprises an earphone housing and an earphone functional component;

the earphone housing comprises an ear hook part, a connection part, and an earphone part;

one end of the connection part is connected to the ear hook part, and the other end thereof is connected to the earphone part;

the earphone functional component comprises an earphone circuit board, an earphone battery module, an earphone speaker module, and a heart rate detection module;

the earphone circuit board and the earphone battery module are both fixedly provided on the ear hook part;

the earphone battery module is electrically connected to the earphone circuit board;

the earphone speaker module is fixedly provided on the earphone part and electrically connected to the earphone circuit board;

the heart rate detection module is provided on the earphone part and electrically connected to the earphone circuit board;

wherein the earphone compartment comprises a compartment body, the compartment body comprises a compartment main body and a compartment cover, the compartment cover is connected to the compartment main body, the compartment cover is opened or closed, the compartment main body is provided with two earphone slots, both of the two earphone slots comprise a first slot body part and a second slot body part, the first slot body part and the second slot body part are communicated, the first slot body part is configured to place the ear hook part, the second slot body is configured to place the earphone part, the compartment cover is provided with two compartment cover slots;

when the compartment cover is closed, the two compartment cover slots are respectively communicated to the two earphone slots;

wherein the earphone compartment further comprises a compartment functional component, and the compartment functional component comprises a compartment circuit board, a compartment battery module, and a heart rate display screen;

the compartment circuit board and the compartment battery module are provided in the compartment main body, and the compartment battery module is electrically connected to the compartment circuit board;

the heart rate display screen is provided on one side of the compartment main body and electrically connected to the compartment circuit board;

the heart rate display screen displays a heart rate value of a user detected by the heart rate detection module.

2. The heart rate detection earphone device according to claim 1, wherein the compartment circuit board is electrically connected with a plurality of charging pins, and when the heart rate detection earphone is placed in the earphone slots, each of the charging pins is respectively in contact with and electrically connected to each of the charging columns.

3. The heart rate detection earphone device according to claim 1, wherein the compartment circuit board is electrically connected with a USB charging module, the compartment main body is provided with a charging slot that is penetrated through, and the USB charging module is penetrated through the charging slot.

4. The heart rate detection earphone device according to claim 1, wherein the compartment circuit board is electrically connected with a control button, the compartment main body is provided with a button hole that is penetrated through, and the control button is penetrated and fitted with the button hole.

5. The heart rate detection earphone device according to claim 1, wherein one side of the compartment cover is rotatably connected to one side of the compartment main body, the other side of the compartment cover is fixedly provided with a first magnetic attraction piece, and the other side of the compartment main body is fixedly provided with a second magnetic attraction piece;

when the compartment cover is closed, the first magnetic attraction piece and the second magnetic attraction piece are magnetically fixed.

6. The heart rate detection earphone device according to claim 1, wherein one side of the compartment cover is rotatably connected to one side of the compartment main body, the other side of the compartment cover is fixedly provided with a first magnetic attraction piece, and the other side of the compartment main body is fixedly provided with a second magnetic attraction piece;

when the compartment cover is closed, the first magnetic attraction piece and the second magnetic attraction piece are magnetically fixed.

* * * * *